United States Patent
Bayerle et al.

(10) Patent No.: US 6,644,285 B2
(45) Date of Patent: Nov. 11, 2003

(54) METHOD FOR CONTROLLING AN INTERNAL COMBUSTION ENGINE

(75) Inventors: Klaus Bayerle, Obertraubling (DE); Harry Schüle, Neunburg V. Wald (DE); Hong Zhang, Tegernheim (DE)

(73) Assignee: Siemens Aktiengesellschaft, Munich (DE)

(*) Notice: Subject to any disclaimer, the term of this patent is extended or adjusted under 35 U.S.C. 154(b) by 99 days.

(21) Appl. No.: 10/034,059

(22) Filed: Dec. 20, 2001

(65) Prior Publication Data
US 2002/0083927 A1 Jul. 4, 2002

(30) Foreign Application Priority Data
Dec. 20, 2000 (DE) .......................... 100 63 677

(51) Int. Cl.$^7$ .............................. F02D 41/06
(52) U.S. Cl. ................................. 123/491
(58) Field of Search .................. 123/480, 491, 123/436, 679, 680, 685, 1 A, 510

(56) References Cited

U.S. PATENT DOCUMENTS

| 5,121,732 A | * | 6/1992 | Benninger et al. | .......... 123/672 |
| 5,197,445 A | | 3/1993 | Casari | |
| 5,301,648 A | * | 4/1994 | Uchinami | .......... 123/491 |
| 5,542,394 A | * | 8/1996 | Tomisawa | .......... 123/491 |

FOREIGN PATENT DOCUMENTS

| DE | 41 17 440 A1 | 12/1991 |
| DE | 40 27 947 A1 | 3/1992 |

* cited by examiner

Primary Examiner—Henry C. Yuen
Assistant Examiner—Arnold Castro
(74) Attorney, Agent, or Firm—Laurence A. Greenberg; Werner H. Stemer; Gregory L. Mayback

(57) ABSTRACT

A correction factor takes into account the possible change in the quality of the fuel fed to an internal combustion engine between shut-down and restarting of the internal combustion engine. The correction factor is applied to the basic injection time period in the internal combustion engine. The correction factor is weighted with a weighting factor that is selected as a function of the filling level of a fuel reservoir container holding the fuel when the internal combustion engine is shut down, and of the filling level when the internal combustion engine is restarted.

7 Claims, 2 Drawing Sheets

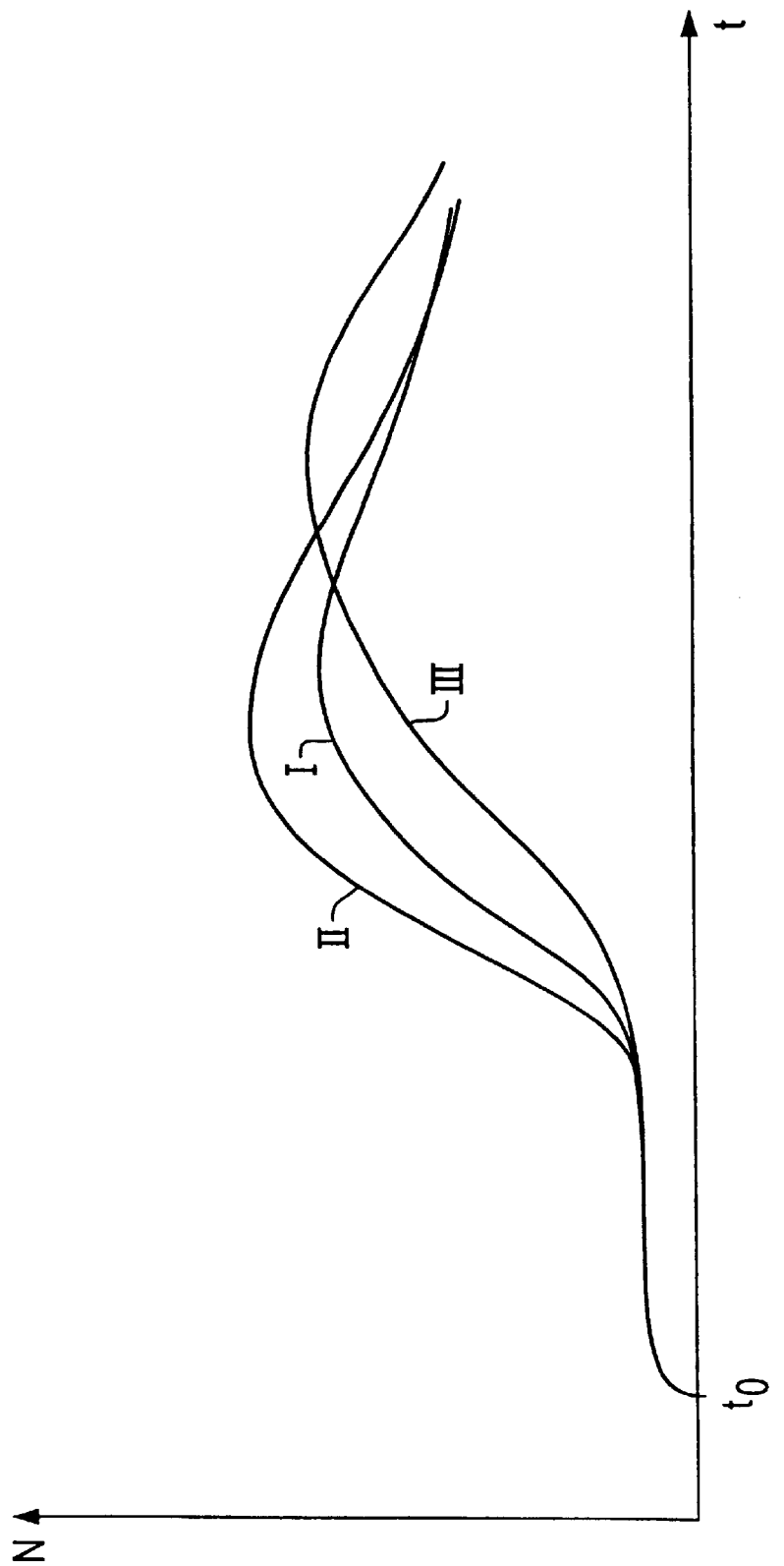

METHOD FOR CONTROLLING AN INTERNAL COMBUSTION ENGINE

BACKGROUND OF THE INVENTION

Field of the Invention

The invention lies in the internal combustion technology field. More specifically, the invention relates to a method for controlling an internal combustion engine wherein a possible change in the fuel quality between the shutting down and subsequent restarting of the internal combustion engine is taken into account.

Fuels for internal combustion engines are composed of a mixture of hydrocarbon compounds which can contain additives of oxygen-containing, organic components, and additives for improving the properties.

Depending on the proportion of the different hydrocarbons in the fuel, there are different effects on the operating behavior of the internal combustion engine, in particular the power, the consumption, the acoustics, the starting capability, and the exhaust gas emissions are influenced. Modern internal combustion engines must be capable of processing fuels of differing quality without appreciable adverse effects on the operating behavior.

At present, changes in the fuel quality are detected using what is referred to as a fuel quality detector or the unsmooth running method and compensated by changing the injection time period. In those method, which are already applied, the rise in the rotational speed is evaluated when the internal combustion engine starts, or the fluctuations in the rotational speed are evaluated during starting. If the rise in the rotational speed or the fluctuations in the rotational speed do not lie within a permitted, predefined confidence limit, the injection time period is correspondingly corrected. The specific value of the correction is however calculated relatively imprecisely so that under certain circumstances the correction may be excessive. In particular, given what is referred to as a "poor start,", the injection time period is changed in such a way that the fuel/air mixture becomes richer, for which reason the fuel/air mixture after a refueling process of a very good fuel can become too rich. The internal combustion engine then starts only poorly or even does not start at all any more. Furthermore, there is the risk that the undesired rotational-speed behavior was not caused by a changed quality in the fuel but rather has other fault sources.

U.S. Pat. No. 5,197,445 (corresponding to German patent application DE 40 27 947 A1) describes various methods with which the changes in fuel quality can be taken into account. On the one hand, after each time the vehicle driven by the internal combustion engine is refueled the control error in the lambda control circuit can be measured and an adaptation value can be changed in such a way that the control error which is determined disappears. This method has the disadvantage that it functions only if the lambda control is active, which is, however, not the case in particular when the internal combustion engine is cold. On the other hand, methods are proposed which, even when the internal combustion engine is cold, ensure that the internal combustion engine is operationally capable if the fuel composition changes severely when refueling occurs, for example as a result of the fact that a tank containing fuel has almost been run empty and that a fuel which predominantly contains methanol has been used for refueling. Using the tank levels before and after the refueling and on the basis of the data on commercially available fuels, an estimate of what fuel compositions may be present is made. The pilot control values are then changed for the operation of the internal combustion engine with fuels of the possible compositions, and an examination is made, assuming the composition with which the internal combustion engine runs best. The internal combustion engine is then regulated further using these values.

SUMMARY OF THE INVENTION

It is accordingly an object of the invention to provide a method of controlling an internal combustion engine, which overcomes the above-mentioned disadvantages of the heretofore-known devices and methods of this general type and which enables fault-free running of the internal combustion engine to be achieved even if refueling has been carried out with fuel that differs greatly in its composition from the fuel which was fed to the internal combustion engine before the refueling.

With the foregoing and other objects in view there is provided, in accordance with the invention, a method for controlling an internal combustion engine, which comprises:

determining a basic injection time period in dependence on operating parameters of the internal combustion engine;

correcting the basic injection time period with a correction factor taking into account a possible change in a quality of fuel fed to the internal combustion engine between a shutting down and a restarting of the internal combustion engine;

weighting the correction factor with a weighting factor; and selecting the weighting factor in dependence on a filling level of a fuel reservoir container holding the fuel when the internal combustion engine is shut down, and on the filling level when the internal combustion engine is restarted.

In accordance with an added feature of the invention, the method comprises:

determining and storing a first value for the filling level when the internal combustion engine is shut down;

determining a second value for the filling level when the internal combustion engine is subsequently restarted;

determining a percentage that constitutes a measure for a possible change in the fuel quality between the engine shutdown and the engine restart from the first and second values;

inputting the percentage as an input variable to a characteristic diagram; and reading out values for the weighting factor from the characteristic diagram.

In accordance with an additional feature of the invention, the above-mentioned percentage is determined in accordance with the relationship:

$$q_{f1}=(F2-F1)/F2 \cdot 100\%,$$

where $q_{f1}$ is the percentage, F1 is the first value of the filling level at shut-down of the internal combustion engine, and F2 is the second value of the filling level at the subsequent restart of the internal combustion engine.

In accordance with another feature of the invention, the relationship between the percentage and the weighting factor is determined experimentally.

In accordance with a further feature of the invention, the correction factor is weighted according to the relationship:

$$FAC\_FQ\_AD_{n+1}=FAC\_FQ\_AD_n$$

wherein $FAC\_FQ\_AD_{n+1}$ is a current correction factor, $FAC\_FQ\_AD_n$ is a previous correction factor for a detection of the fuel quality, and $q_{f2}$ is the weighting factor.

In accordance with again a further feature of the invention, the weighting factor lies in a range from 0 to 0.999.

In accordance with a concomitant feature of the invention, the percentage is used in fault diagnostics of the internal combustion engine.

In other words, in the invention, an estimate of a possible change in fuel quality is carried out using a filling level change of the fuel reservoir container between the shutting down of the internal combustion engine and restarting of the internal combustion engine. If there is a specific quantity of fuel in the fuel reservoir container and the time when the internal combustion engine is shut down and if the quantity which is determined when the internal combustion engine is restarted is greater than said specific quantity, it can be assumed that the vehicle has been refueled. A percentage, which constitutes a measure of a possible change in the fuel quality, is determined as a function of the filling level before the shutting down and the filling level before the restarting.

Using this-information, it is possible to weight the change in the injection time period in addition to the detection of the fuel quality or unsmooth running method. The influence of the correction factor is reduced by a value which is dependent on the percentage change in the filling level.

Other features which are considered as characteristic for the invention are set forth in the appended claims.

Although the invention is illustrated and described herein as embodied in method for controlling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagram showing the variation in the rotational speed over time for different fuel qualities when starting occurs.

DESCRIPTION OF THE PREFERRED EMBODIMENTS

Figure 1:
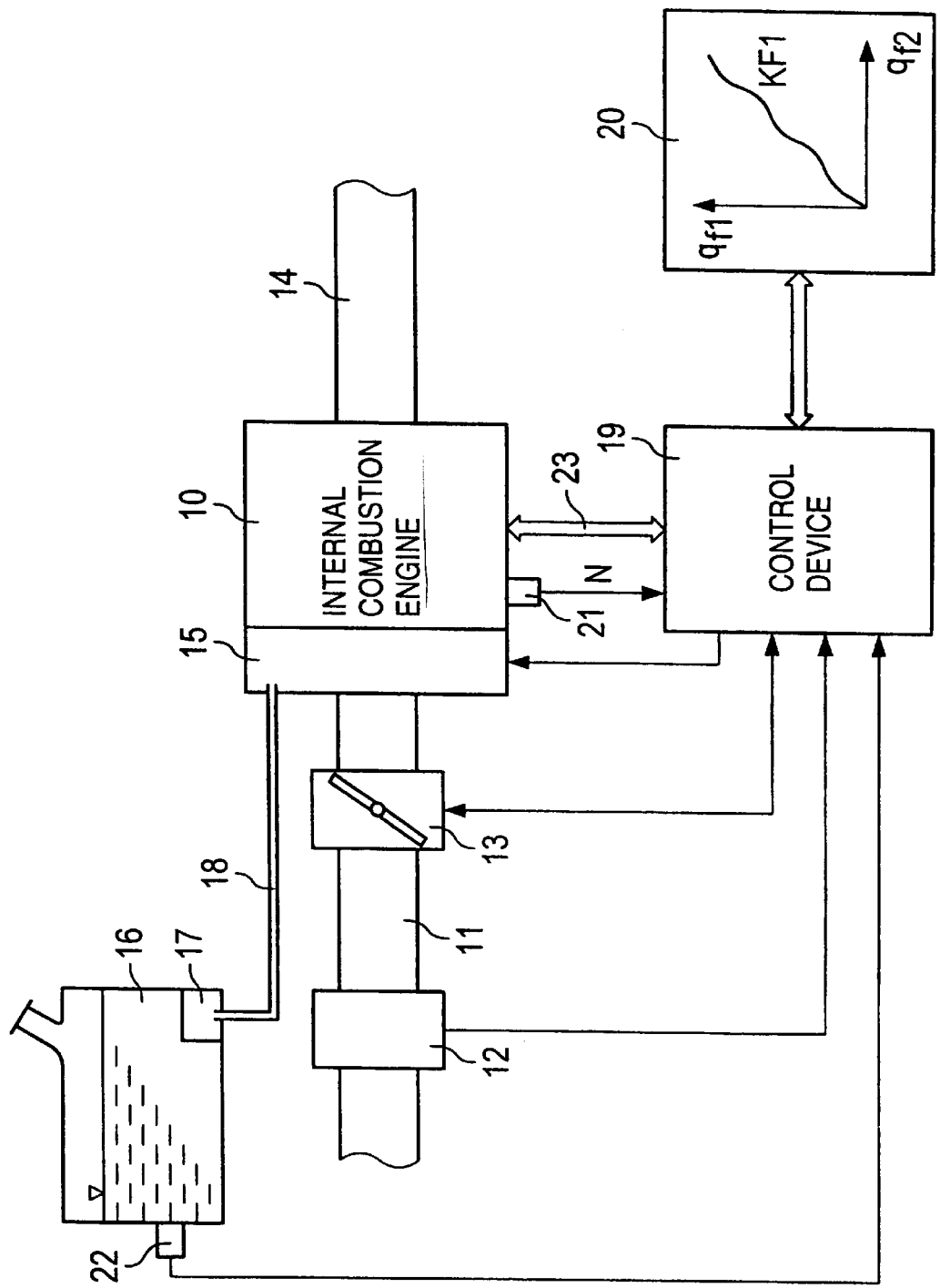
FIG. 1 is a block circuit diagram of an internal combustion engine with a control device which is assigned to it and wherein the method according to the invention is applied.

Referring now to the figures of the drawing in detail and first, particularly, to FIG. 1 thereof, there is shown, in a very simplified form of a block circuit diagram, an internal combustion engine with a control device assigned to it. Only those components which are necessary for the comprehension of the invention are illustrated. In particular, the exhaust gas post-treatment device has been omitted from the illustration.

Air which is necessary for the combustion is fed to the internal combustion engine 10 via an intake duct 11. An air mass flow rate meter 12 and a throttle valve 13 are provided in series, viewed in the direction of flow of the intake air, in the intake duct 11. At the output end, the internal combustion engine 10 is connected to an exhaust duct 14 wherein an exhaust catalytic converter is arranged with a muffler downstream of it. The internal combustion engine 10 is assigned a fuel supply system, for example a fuel injection system 15. Fuel is fed to the fuel injection system from a fuel reservoir container 16 by means of a fuel pump 17 via a fuel line 18. The fuel injection system 15 has injection valves which inject the fuel either into the intake manifold of the intake duct 11 or directly into the cylinders of the internal combustion engine 10 (direct injection).

The air mass flow rate meter 12 is used as a load sensor in what is referred to as air mass flow rate-based control of the internal combustion engine 10. As an alternative to the air mass flow rate meter 12 it is also possible to use a pressure sensor as the load sensor, which pressure sensor is arranged in the intake duct 11 of the internal combustion engine 10.

The throttle valve 13 is, for example, an electrically actuated throttle element (E-gas) whose opening passage area can be set both by actuation by the driver (driver's request) and as a function of the operating range of the internal combustion engine 10 by means of signals of a control device 19 which controls the internal combustion engine 10. Such electronic control devices 19, which generally contain one or more microprocessors and which not only inject the fuel but also perform a multiplicity of further control and regulation tasks, are known per se so that only details of the design and method of operation which are relevant in conjunction with the invention will be given below. In particular, the control device 19 is connected to a storage device 20 wherein, inter alia, different characteristic diagrams and threshold values are stored. The rotational speed N of the internal combustion engine is sensed using a rotational speed sensor 21 which outputs a corresponding signal to the control device 17. A filling level sensor 22, which outputs to the control device 19 a signal which corresponds to the filling level in the fuel reservoir container 16, is arranged on the fuel reservoir container 16.

The control device 19 is also connected via a data and control line 23 to further sensors and actuators (not illustrated explicitly) for controlling and regulating the internal combustion engine 10.

The graphic relationship between the rotational speed N and the time t for an internal combustion engine which is started with different fuels of different quality is illustrated in FIG. 2. At the time $t_0$, the starter of the internal combustion engine is activated by means of the ignition starter switch. A normal characteristic curve is identified with the reference symbol I. This rotational speed profile is obtained when the internal combustion engine is operated with a conventional fuel of average quality. If the internal combustion engine is operated with a low-quality fuel, i.e. with an air/fuel mixture wherein a fuel that is poorer than average is used, a rotational speed profile according to the characteristic curve III is obtained.

If the internal combustion engine is operated with an air/fuel mixture wherein an above average, good fuel is used, a rotational speed profile according to curve II is obtained. In order to prevent that the internal combustion engine stalls owing to the excessively rich air/fuel mixture, the air/fuel mixture must be made leaner. In contrast, in the case of the characteristic curve III the air/fuel mixture must be made richer.

The following explains how a change in fuel quality can be estimated using a change in the filling level in the fuel reservoir container 16 and can be taken into account in the determination of the injection time period for the injection valve of the injection device.

Depending on the operating state of the internal combustion engine, a plurality of correction variables are applied to a basic injection time period TI_B formed from the load signal and the rotational speed N by the control device 19. The correction variables can act on the basic injection time period TI_B either multiplicatively or additively here. A correction variable is what is referred to as the fuel quality detection factor FAC_FQ_AD. This correction variable is selected as a function of the rise in the rotational speed when the internal combustion engine starts and/or of fluctuations in the rotational speed that occur when starting takes place. In the following example, the correction variable is logically linked to the basic injection time period TI_B multiplicatively as a correction factor FAC_FQ_AD.

$$TI=TI\_B*FAC\_FQ\_AD* \ldots,$$

where TI designates an overall injection time period and further correction variables are omitted.

The value of the correction variable preferably lies in the range between 0.9 and 1.2. If, for example, on starting of the internal combustion engine, a rotational speed profile is obtained such as is shown by the curve III in FIG. 2, a value>1 is selected for the correction factor FAC_FQ_AD because this brings about a lengthening of the injection time period and thus enrichment of the fuel/air mixture. However, if a rotational speed profile is obtained such as is illustrated by the curve II in FIG. 2, a value<1 is selected for the correction factor FAC_FQ_AD because this causes the fuel/air mixture to be made leaner.

If the internal combustion engine is shut down, at this time the filling level in the fuel reservoir container 16 is determined by evaluating the signal of the filling level sensor 22 and this value for the filling level F1 is stored in the storage device 20. When the internal combustion engine 10 is restarted, the filling level is determined again and this value F2 is compared with the stored value F1. If the filling level F2 differs from the filling level F1 and if F2>F1, it is possible to assume that the vehicle has been refueled, i.e. the fuel reservoir container 16 has been at least partially filled. The fuel quality can then have changed only by a percentage qf1 as a result of the refueling process. This percentage is determined in accordance with the following relationship:

$$q_{f1}=(F2-F1)/F2 \cdot 100\%, \qquad (1)$$

whereby the values of $q_{f1}$ lie in a range between 0% (if the fuel reservoir container 16 has not been filled between the shutting down of the internal combustion engine and its restarting) and 100% (if the fuel reservoir container 16 was completely emptied when the internal combustion engine was shut down and was refueled before the internal combustion engine was restarted).

The values calculated for $q_{f1}$ in accordance with equation (1) are input variables for a characteristic diagram KF1 stored in a memory device 20. Associated weighting factors $q_{f2}$ are stored in the characteristic diagram KF1, the values of $q_{f2}$ lying in the range between 0 and 0.999. The relationship between the percentages $q_{f1}$ and the weighting factor $q_{f2}$ is determined experimentally by trials.

The correction factor FAC_FQ_AD for the detection of the fuel quality is weighted with this weighting factor $q_{f2}$ in accordance with the following relationship:

$$FAC\_FQ\_AD_{n-1}=FAC\_FQ\_AD_n(1-q_{f2}), \text{ where}$$

FAC_FQ_AD$_{n+1}$ designates the current correction factor and FAC_FQ_AD$_n$ designates the previous correction factor for the detection of the fuel quality.

In addition, it is possible to use the value of the percentage $q_{f1}$ for fault diagnostics of the internal combustion engine. If the value of the percentage $q_{f1}$ tends toward zero when there has been no refueling between shutting down of the internal combustion engine and restarting and the internal combustion engine nevertheless starts poorly when restarting occurs, a change in the fuel quality can be ruled out as a possible fault source and other fault sources can be investigated (ignition misfires, combustion misfires, faults in the injection device etc.).

We claim:

1. A method for controlling an internal combustion engine, which comprises:
   determining a basic injection time period in dependence on operating parameters of the internal combustion engine;
   correcting the basic injection time period with a correction factor taking into account a possible change in a quality of fuel fed to the internal combustion engine between a shutting down and a restarting of the internal combustion engine;
   weighting the correction factor with a weighting factor; and
   selecting the weighting factor in dependence on a filling level of a fuel reservoir container holding the fuel when the internal combustion engine is shut down, and on the filling level when the internal combustion engine is restarted.

2. The method according to claim 1, which comprises:
   determining and storing a first value for the filling level when the internal combustion engine is shut down;
   determining a second value for the filling level when the internal combustion engine is subsequently restarted;
   determining a percentage that constitutes a measure for a possible change in the fuel quality between the engine shutdown and the engine restart from the first and second values;
   inputting the percentage as an input variable to a characteristic diagram; and
   reading out values for the weighting factor from the characteristic diagram.

3. The method according to claim 2, which comprises determining the percentage in accordance with the relationship:

$$q_{f1}=(F2-F1)/F2 \cdot 100\%,$$

where $q_{f1}$ is the percentage, F1 is the first value of the filling level at shut-down of the internal combustion engine, and F2 is the second value of the filling level at the subsequent restart of the internal combustion engine.

4. The method according to claim 2, which comprises determining a relationship between the percentage and the weighting factor by experiment.

5. The method according to claim 1, which comprises weighting the correction factor according to the relationship:

$$FAC\_FQ\_AD_{n+1}=FAC\_FQ\_AD_n$$

wherein FAC_FQ_AD$_{n+1}$ is a current correction factor, FAC_FQ_AD$_n$ is a previous correction factor for a detection of the fuel quality, and $q_{f2}$ is the weighting factor.

6. The method according to claim 5, wherein the weighting factor lies in a range from 0 to 0.999.

7. The method according to claim 2, which comprises introducing the percentage in fault diagnostics of the internal combustion engine.

* * * * *